(12) United States Patent
Maheshwari et al.

(10) Patent No.: US 8,411,625 B2
(45) Date of Patent: Apr. 2, 2013

(54) VARIABLE CODING LENGTH FOR RESOURCE ALLOCATION

(75) Inventors: Shashikant Maheshwari, Irving, TX (US); Adrian Boariu, Irving, TX (US); Chao Wei, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 802 days.

(21) Appl. No.: 12/497,292

(22) Filed: Jul. 2, 2009

(65) Prior Publication Data

US 2010/0008314 A1   Jan. 14, 2010

Related U.S. Application Data

(60) Provisional application No. 61/078,364, filed on Jul. 4, 2008.

(51) Int. Cl.
*H04W 4/00* (2009.01)

(52) U.S. Cl. ........ 370/329; 370/328; 370/330; 370/326; 455/450; 455/464; 455/460

(58) Field of Classification Search .................. None
See application file for complete search history.

(56) References Cited

U.S. PATENT DOCUMENTS

| | | | | |
|---|---|---|---|---|
| 6,658,235 | B1 * | 12/2003 | Tolmunen et al. | 455/67.13 |
| 2005/0201280 | A1 * | 9/2005 | Lundby et al. | 370/229 |
| 2006/0209669 | A1 * | 9/2006 | Nishio | 370/208 |
| 2007/0230387 | A1 * | 10/2007 | Roh et al. | 370/311 |
| 2008/0089354 | A1 * | 4/2008 | Yoon et al. | 370/432 |
| 2008/0159220 | A1 * | 7/2008 | Kitchin et al. | 370/329 |
| 2009/0296624 | A1 * | 12/2009 | Ryu et al. | 370/312 |

OTHER PUBLICATIONS

Hamiti, S., "The Draft IEEE 802.16m System Description Document", IEEE 802.16 Broadband Wireless Access Working Group, IEEE 802.16m-08_1003r3, Jun. 16, 2008, 56 pages.

* cited by examiner

*Primary Examiner* — Hassan Phillips
*Assistant Examiner* — Anez Ebrahim
(74) *Attorney, Agent, or Firm* — Brake Hughes Bellermann LLP

(57) ABSTRACT

According to one general aspect, a method comprising establishing a connection with at least one mobile station (MS). The method further comprising, in one embodiment, allocating communication resources, in resource blocks, to the MS. In various embodiments, the method also comprising selecting a size of a burst length field based in part upon a bandwidth and a number of orthogonal frequency-division multiplexing (OFDM) symbols used to communicate with the MS. In another example embodiment, the method also comprising selecting a size of a burst length field based in part upon a bandwidth and scheduling time duration (which can be based upon sub-frame, multiple sub-frame or frame duration) used to communicate with the MS. In one embodiment, the method may also include transmitting, to the MS, a message that includes the burst length field. In some embodiments, the burst length field may indicate to the MS the number of resource blocks allocated to the MS for purposes of communication.

8 Claims, 11 Drawing Sheets

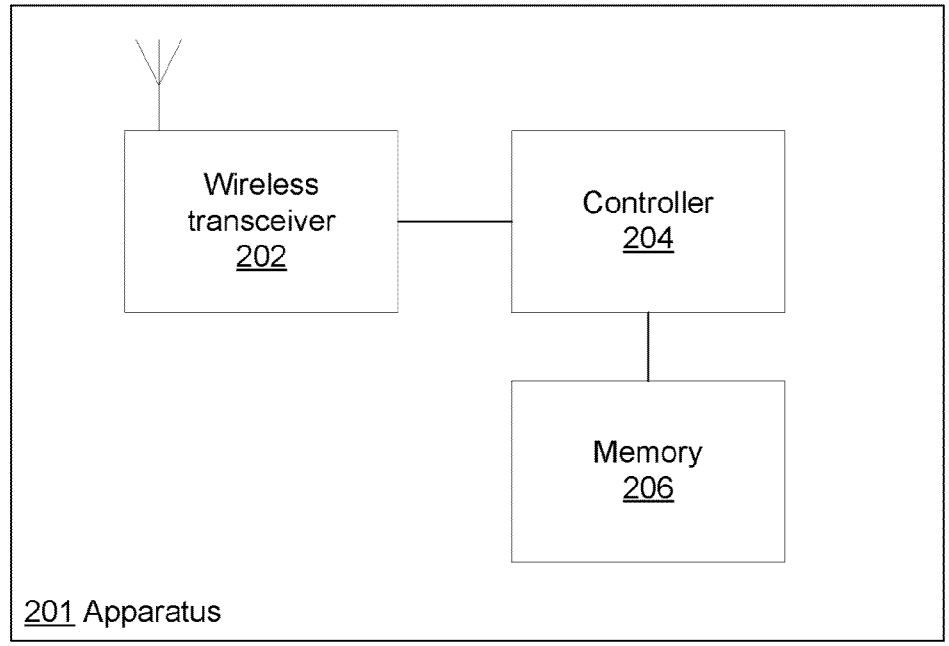
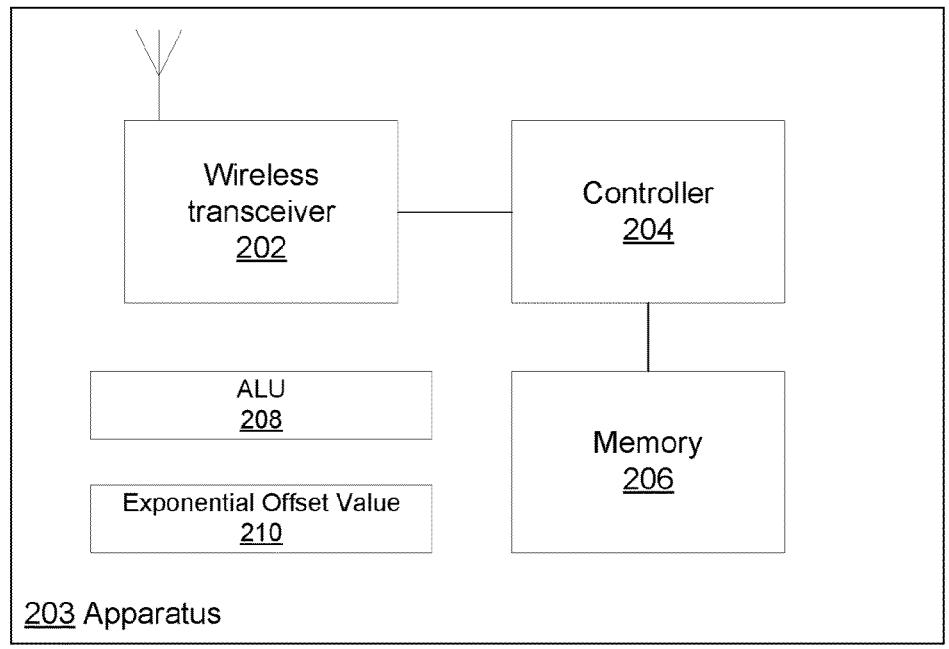
*FIG. 2*

| System Bandwidth | Downlink, PUSC No Uplink sub-frames | Uplink, PUSC 6 OFDM symbols for DL | 802.16m 1 sub-frame (6 OFDM symbols) | 802.16m 2 sub-frames (12 OFDM symbols) |
|---|---|---|---|---|
| 5 MHz | 360 (9 bits) | 238 (8 bits) | 24 (5 bits) | 48 (6 bits) |
| 10 MHz | 720 (10 bits) | 490 (9 bits) | 48 (6 bits) | 96 (7 bits) |
| 20 MHz | 1440 (11 bits) | 980 (10 bits) | 96 (7 bits) | 192 (8 bits) |

FIG. 6
600

| Fixed Sized 602 | Variable Sized 604 | Total Burst Length 606 | Possible allocation blocks 608 |
|---|---|---|---|
| Value | Number of bits | Number of bits | |
| 0 | 2 | 5 | 1-4 |
| 1 | 2 | 5 | 5-8 |
| 2 | 3 | 6 | 9-16 |
| 3 | 4 | 7 | 17-32 |
| 4 | 5 | 8 | 33-64 |
| 5 | 6 | 9 | 65-128 |
| 6 | 7 | 10 | 129-256 |
| 7 | 8 | 11 | 257-512 |

Fixed Sized Portion = 3 bits
Exponential Offset Value = 1

FIG. 7
700

| Fixed Sized 702 | Variable Sized 704 | Total Burst Length 706 | Possible allocation blocks 708 |
|---|---|---|---|
| Value | Number of bits | Number of bits | |
| 0 | 3 | 6 | 1-8 |
| 1 | 3 | 6 | 9-16 |
| 2 | 4 | 7 | 17-32 |
| 3 | 5 | 8 | 33-64 |
| 4 | 6 | 9 | 65-128 |
| 5 | 7 | 10 | 129-256 |
| 6 | 8 | 11 | 257-512 |
| 7 | 9 | 12 | 513-1024 |

Fixed Sized Portion = 3 bits
Exponential Offset Value = 2

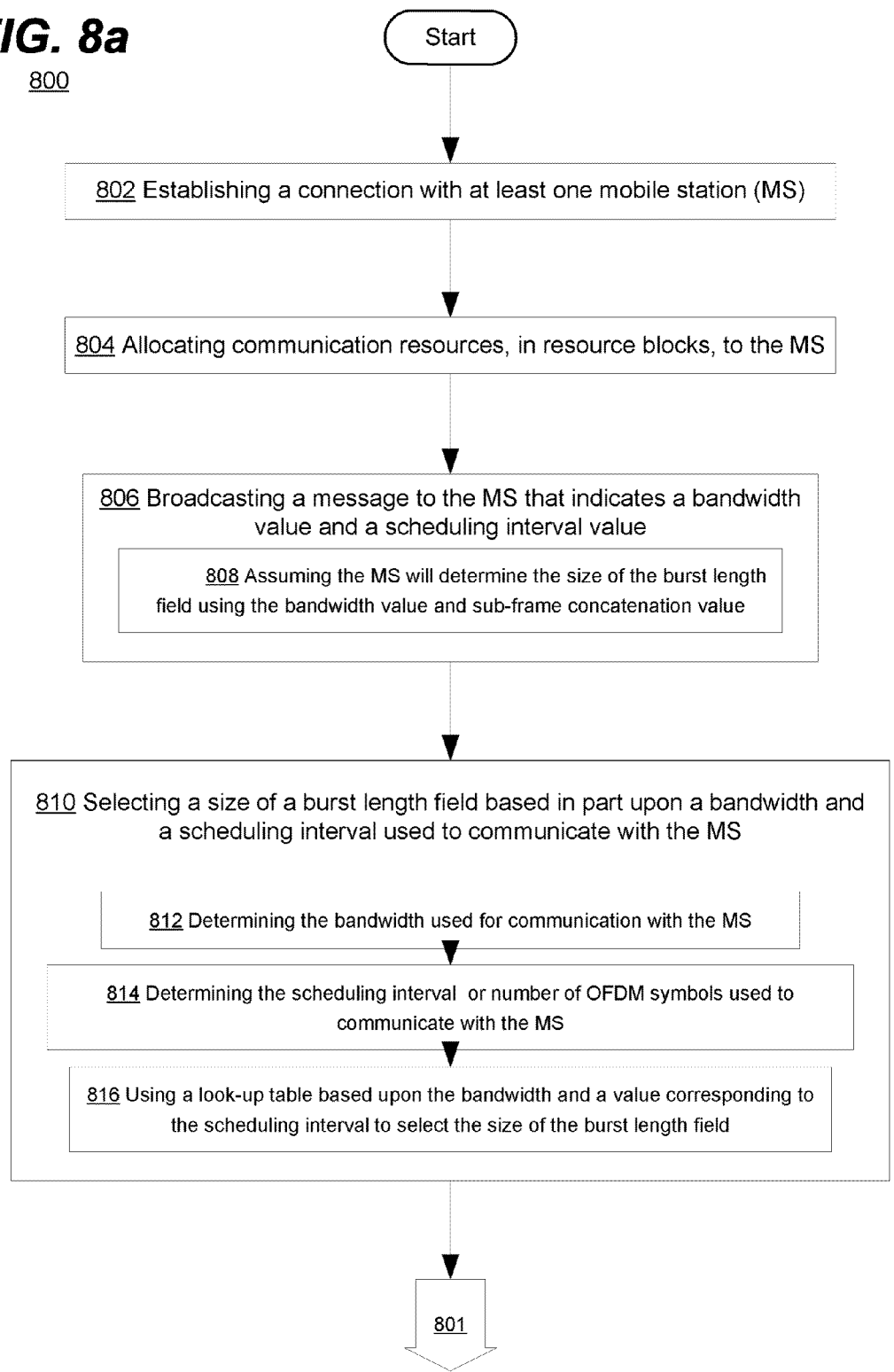

810 Selecting a size of a burst length field based in part upon a bandwidth and a scheduling interval used to communicate with the MS 830 Computing the value of the fixed sized portion by:

832 Calculating an integer portion of a binary logarithm of the number of allocated resource blocks minus one 834 Subtracting a predetermined exponential offset value from the integer portion of the binary logarithm 836 Wherein the lowest value of the fixed sized portion is zero 837 Converting the computed value into a binary representation using a fixed sized number of bits 840 Computing the value of the variable sized portion as:

842 If the value of the fixed sized portion is zero, setting the value of the variable sized portion equal to the number of allocated resource blocks minus one 844 If the value of the fixed sized portion is greater than zero, setting the value of the variable sized portion equal to:
the number of allocated resource blocks minus one,
minus two to the power of the integer portion of the binary logarithm of the number of allocated resource blocks 850 Computing the size of the variable sized portion by:

852 Calculating the integer portion of the binary logarithm of one less than the number of allocated resource blocks 854 Wherein the smallest size of the variable sized portion equals one plus a predetermined exponential offset value 855 Converting the value into a binary representation using the variable sized portion of bits.

810 Selecting a size of a burst length field based in part upon a bandwidth and a scheduling interval used to communicate with the MS

860 Determining a maximum number of possible resource blocks based upon the bandwidth and number of OFDM symbols

862 Computing a maximum size of the variable sized portion by calculating the integer portion of the binary logarithm of the number of resource blocks minus one

864 Computing an exponential offset value by subtracting a number of bits of the fixed sixed portion from the binary logarithm

866 If the number of allocated resource blocks is less than or equal to one-fourth a maximum number of possible resource blocks, selecting a size of the burst length field that is equal to or less than the binary logarithm of the maximum number of possible resource blocks

868 If the number of allocated resource blocks is greater than one-fourth a maximum number of possible resource blocks, selecting a size of the burst length field that is greater than the binary logarithm of the maximum number of possible resource blocks

870 Wirelessly transmitting a message that indicates an encoding scheme used to encode the burst length field

872 Wirelessly transmitting, to the MS, a message that includes the burst length field End

FIG. 9
900

```
                        ( Start )
                            │
                            ▼
        ┌───────────────────────────────────────────────┐
        │  902 Encoding an index field for transmission │
        │  ┌─────────────────────────────────────────┐  │
        │  │ 904 Wherein the encoded index field includes: │
        │  │ a fixed sized portion, and a variable sized portion. │
        │  │ wherein the size of the variable sized portion is related to the value of the fixed size portion │
        │  └─────────────────────────────────────────┘  │
        │                                               │
        │   ┌──────────────────────────────────────┐    │
        │   │ 906 Wherein the value of the index field is calculated as: │
        │   └──────────────────────────────────────┘    │
        │                     ▼                         │
        │   ┌──────────────────────────────────────┐    │
        │   │ 908 If the value of the fixed sized portion is non-positive, one plus the value of the │
        │   │ variable sized portion │
        │   └──────────────────────────────────────┘    │
        │                     ▼                         │
        │   ┌──────────────────────────────────────┐    │
        │   │ 910 If the value of the fixed sized portion is positive, │
        │   │ one plus the value of the variable sized portion │
        │   │ plus two to the power of the sum of the value of the fixed sized portion and an │
        │   │ predetermined exponential offset value │
        │   └──────────────────────────────────────┘    │
        └───────────────────────────────────────────────┘
                            │
                            ▼
            ┌──────────────────────────────────┐
            │ 912 Wirelessly transmitting the index field │
            └──────────────────────────────────┘
                            │
                            ▼
                        (  End  )
```

VARIABLE CODING LENGTH FOR RESOURCE ALLOCATION

CROSS-REFERENCE TO RELATED APPLICATION

This application claims priority under 35 U.S.C. §119 to U.S. Provisional Patent Application 61/078,364, filed Jul. 4, 2008, titled "VARIABLE CODING LENGTH FOR RESOURCE ALLOCATION," which is incorporated herein by reference in its entirety.

TECHNICAL FIELD

This description relates to mobile communication technology, and more specifically to the reduction of overhead when allocating resource blocks for mobile communication.

BACKGROUND

Typically, wireless networks include a base station that generally couples a wired network with a wireless network and mobile station that uses the wireless network. Often these two devices are in direct communication. However, multiple wireless network standards are in use or development. Due to the ranged nature of wireless networks, it is possible that a mobile station may be connected to or in the range of a number of wireless networks.

Worldwide Interoperability for Microwave Access (WiMAX) is a telecommunications technology often aimed at providing wireless data over long distances (e.g. kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

One particular derivative of the 802.16 standard is the 802.16e standard that addresses mobility. Institute of Electrical and Electronics Engineers, *IEEE Standard for Local and Metropolitan Area Networks, Part 16, Amendment 2*, IEEE Std. 802.16e-2005.

One particular derivative of the 802.16 standard is the, as yet finished, 802.16m standard that attempts to increase the data rate of wireless transmissions to 1 Gbps while maintaining backwards compatibility with older networks. IEEE 802.16 Broadband Wireless Access Working Group, *IEEE 802.16m System Requirements*, Oct. 19, 2007.

SUMMARY

According to one general aspect, a method comprising establishing a connection with at least one mobile station (MS). The method further comprising, in one embodiment, allocating communication resources, in resource blocks, to the MS. In various embodiments, the method also comprising selecting a size of a burst length field based in part upon a bandwidth and a number of orthogonal frequency-division multiplexing (OFDM) symbols used to communicate with the MS. In another example embodiment, the method also comprising selecting a size of a burst length field based in part upon a bandwidth and scheduling time duration (which can be based upon sub-frame, multiple sub-frame or frame duration) used to communicate with the MS. In one embodiment, the method may also include transmitting, to the MS, a message that includes the burst length field. In some embodiments, the burst length field may indicate to the MS the number of resource blocks allocated to the MS for purposes of communication.

According to another general aspect, an apparatus comprising a wireless transceiver, a controller, and a memory. In one embodiment, the wireless transceiver may be configured to establish a connection with at least one mobile station (MS), and wirelessly transmit, to the MS, a message that includes a burst length field. In various embodiments, the controller may be configured to allocate communication resources, in resource blocks, to the MS, and select a size of a burst length field based in part upon a bandwidth and a number of orthogonal frequency-division multiplexing (OFDM) symbols used to communicate with the MS. In another example embodiment, the controller may also configured to allocated communication resources, in resource blocks, to the MS, and selecting a size of a burst length field based in part upon a bandwidth and scheduling time duration (which can be based upon sub-frame, multiple sub-frame or frame duration) used to communicate with the MS. In some embodiments, the memory may be configured to store the burst length field. In various embodiments, the burst length field may indicate to the MS the number of resource blocks allocated to the MS for purposes of communication.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 2 is a block diagram of example embodiments of apparatuses in accordance with the disclosed subject matter.

FIG. 5 is a table of an example embodiment of a system in accordance with the disclosed subject matter.

FIG. 6 is a table of an example embodiment of a system in accordance with the disclosed subject matter.

FIG. 7 is a table of an example embodiment of a system in accordance with the disclosed subject matter.

FIG. 8 is a flowchart of an example embodiment of a technique in accordance with the disclosed subject matter.

FIG. 9 is a flowchart of an example embodiment of a technique in accordance with the disclosed subject matter.

DETAILED DESCRIPTION

Figure 1:
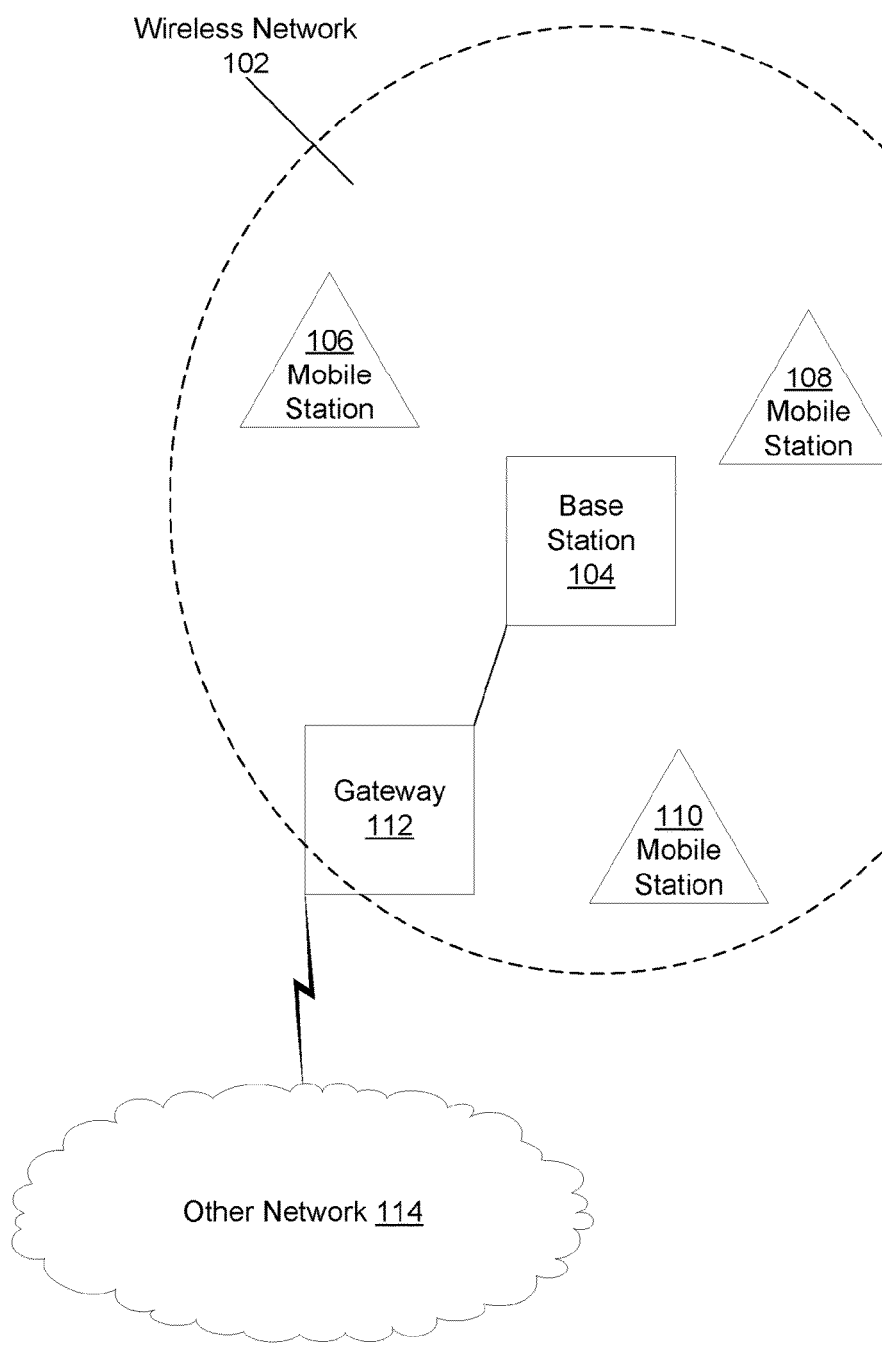
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network 114, such as a Local Area Network, a Wide Area Network (WAN), the Internet, etc. In various embodiments, the base station 104 may be coupled or connected with the other network 120 via an access network controller (ASN) or gateway (GW) 112 that may control, monitor, or limit access to the other network.

FIG. 2 is a block diagram of a wireless device 201 in accordance with an example embodiment of the disclosed subject matter. In one embodiment, the wireless device 201 may include a base station (BS) or a mobile station (MS) such as that illustrated in FIG. 1. In one embodiment, the wireless device 201 may include a wireless transceiver 202, a controller 204, and a memory 206. In some embodiments, the transceiver 202 may include a wireless transceiver configured to operate based upon a wireless networking standard (e.g. WiMAX, WiFi, WLAN, etc.). In various embodiments, the controller 204 may include a processor. In various embodiments, the memory 206 may include permanent (e.g. compact disc, etc.), semi-permanent (e.g. a hard drive, etc.), or temporary (e.g. volatile random access memory, etc.) memory. For example, some operations illustrated and/or described herein, may be performed by a controller 204, under control of software, firmware, or a combination thereof. In another example, some components illustrated and/or described herein, may be stored in memory 206.

FIG. 2 is also a block diagram of a wireless device 203 in accordance with an example embodiment of the disclosed subject matter. In one embodiment, the wireless device 201 may include a base station (BS) or a mobile station (MS) such as that illustrated in FIG. 1. In one embodiment, the wireless device 201 may include a wireless transceiver 202, a controller 204, and a memory 206. In various embodiments, the wireless device 203 may also include an arithmetic logic unit (ALU) 208 configured to perform mathematical computations, as described below. In some embodiments, the controller 204 may include the ALU 208. In various embodiments, the wireless device 203 may include an Exponential Offset Value 210, as described below in reference to FIGS. 6 and 7. In some embodiments, the memory 206 may include or store the Exponential Offset Value 210. For example, some operations illustrated and/or described herein, may be performed by the ALU 208, under control of software, firmware, or a combination thereof.

Figure 3:
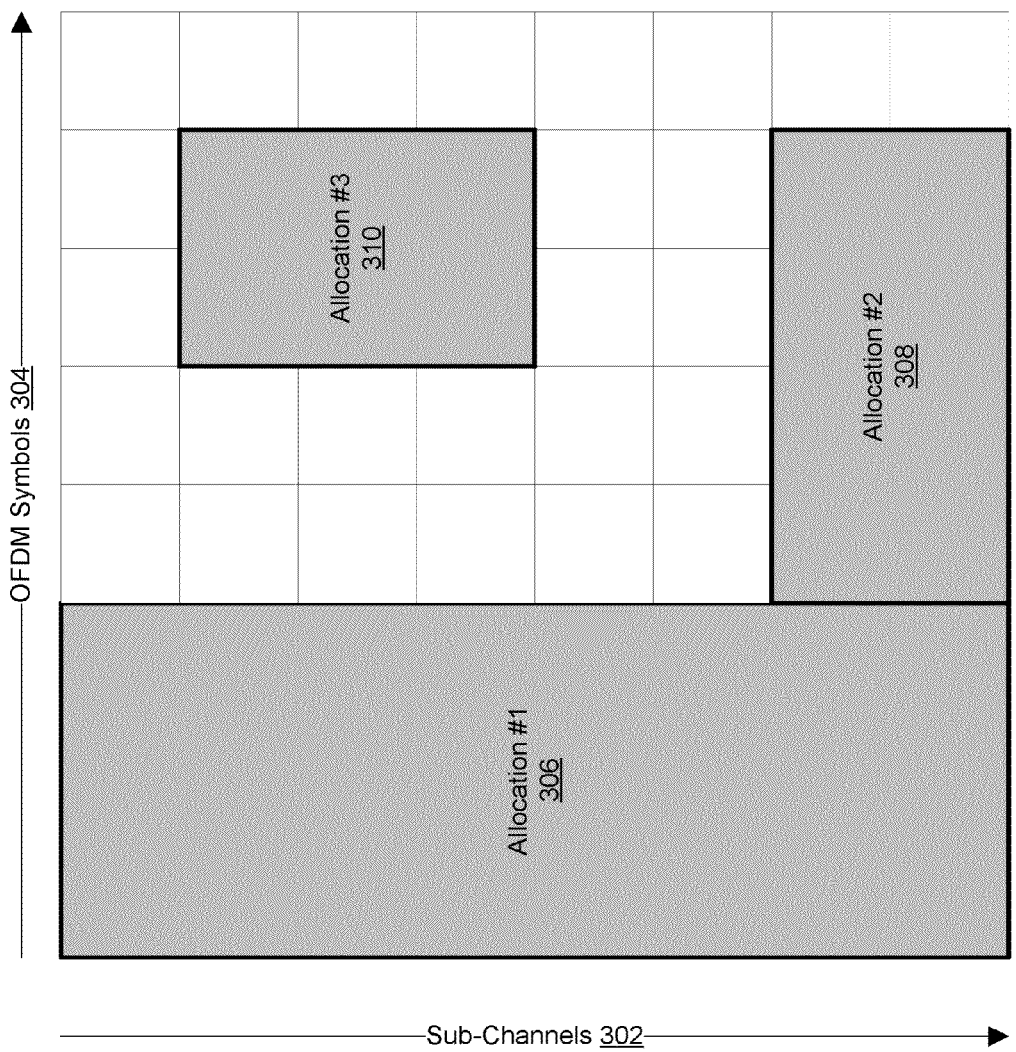
FIG. 3 is a block diagram of an example embodiment of a resource allocation in accordance with the disclosed subject matter.

FIG. 3 is a block diagram of an example embodiment of a resource allocation 300 in accordance with the disclosed subject matter. Often in wireless communication a base station (BS) or other device may control the use of communication resources. These communication resources may be broken into chunks or discrete portions known as resource blocks. In various embodiments, the communication resources may include splitting the available bandwidth (or communication frequency) into a number of subcarriers or sub-channels.

Another communication resource may include orthogonal frequency-division multiplexing (OFDM) symbols. OFDM may include a frequency-division multiplexing (FDM) scheme utilized as a digital multi-carrier modulation technique. In various embodiments, a large number of closely-spaced or distributed orthogonal sub-carriers may be used to carry data. The data may be divided into several parallel data streams or channels, one for each sub-carrier. Each sub-carrier may, in one embodiment, be modulated with a conventional modulation scheme (such as quadrature amplitude modulation (QAM) or Quadrature phase shift keying (QPSK)) at a low symbol rate.

In various embodiments, these sub-channels and OFDM symbols may be conceptually arranged in a rectangular fashion. FIG. 3 is a block diagram of an example embodiment of a resource allocation 300 in accordance with the disclosed subject matter. In such an embodiment, the resource blocks may be arranged with the sub-channels 302 as a first axis, and the number of OFDM symbols 304 as a second axis. In the illustrative example embodiment of resource allocation 300, the total number of resource blocks is 64, divided into 8 sub-channels and 8 sets of OFDM symbols. Although, it is understood that the above is merely one illustrative example to which the disclosed subject matter is not limited.

In such an embodiment, the BS 104 may allocate resources to the three MSs 106, 108, and 110. For example, the MS 106 may be allocated 24 resource blocks comprising allocation #1 306. For example, the MS 108 may be allocated 8 resource blocks comprising allocation #2 308. For example, the MS 110 may be allocated 6 resource blocks comprising allocation #3 310. In various embodiments, these allocations may change or be subject to change during each allocation period, which may be, in one embodiment, a period of time measured in milliseconds.

In some embodiments, the BS 104 may communicate this allocation scheme to the MSs 106, 108, and 110 via a Medium Access Protocol (MAP) message. However, it is understood that different protocols or communication standards may use different message to communicate the information. In various embodiments, two MAP messages may be used, one for the downlink (DL) allocation (BS to MS communication), and another for uplink (UL) communication (MS to BS communication). Although only one generic allocation message and scheme is discussed herein, it is understood that the message and scheme may be used for either or both DL and UL messages. Also, it is understood that the DL and UL allocation may make use of different schemes for allocation and communication of that allocation, and are within the scope of the disclosed subject matter.

Figure 4:
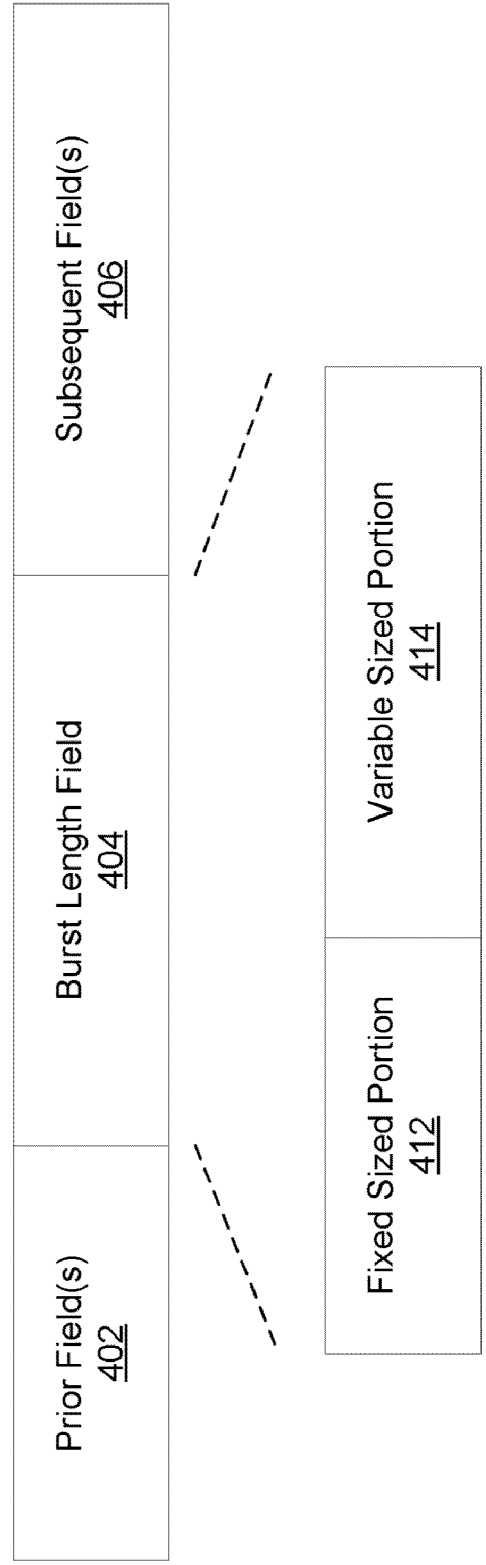
FIG. 4 is a block diagram of an example embodiment of a message in accordance with the disclosed subject matter.

FIG. 4 is a block diagram of an example embodiment of a message 400 in accordance with the disclosed subject matter. In one embodiment, the message 400 may include at least one prior field 402, a burst length field 404, and at least one subsequent field 406. In various embodiments, the prior field 402 may include (not shown) a management type field, a physical layer (PHY) synchronization field, a channel descriptor count field, or a base station identifier (BSID) field; although, it is understood that the above are merely a few illustrative examples to which the disclosed subject matter is not limited. In various embodiments, the subsequent field 406 may include (not shown) a padding nibble; although, it is understood that the above is merely one illustrative example to which the disclosed subject matter is not limited. In various embodiments, the burst length field 404 may include a fixed sized portion 412 and a variable sized portion 414, as described below in reference to FIGS. 6 and 7.

Of immediate interest is the burst length field 404. In various embodiments, the burst length field 404 may indicate the duration or total number of resource blocks in the resource block allocation assigned to the receiving MS. For example, in the embodiment of FIG. 3, the burst length 404 value for allocation #1 306 to MS 104 would be 24. In the 802.16e standard, this field 404 may be referred to as a duration field. For UL messages in the 802.16e standard, the duration field may have a length or size of 10 bits. This 802.16e burst length field holds a simple un-encoded binary number, and may accommodate an allocation of up to 1024 resource blocks (1024=$2^{10}$). Although, it is understood that the above are merely a few illustrative examples to which the disclosed subject matter is not limited.

FIG. 5 is a table 500 of an example embodiment of a system in accordance with the disclosed subject matter. In various embodiments, there may be more or less available resource blocks than the 10 bit burst length field of the 802.16e standard (herein used as a reference embodiment) can or needs to accommodate. In one embodiment, the number of available or allocatable resource blocks may be determined by the frequency or bandwidth used to communicate between the BS and the MS (and vice versa) and the number of OFDM symbols or scheduling interval used to communicate between the BS and the MS. In one embodiment, the BS and MS may determine the maximum number of bits or size to use to represent the burst length field 404.

Table 500 represents twelve different example embodiments of the system 100 of FIG. 1. Column 502 illustrates the System Bandwidth or frequency of used by the BS 104 and MS 106 to communicate. Column 504 illustrates three embodiments, in which the Downlink uses a scheme known as Partial Usage of Sub-Channels (PUSC) and in which no UL sub-frames or resource blocks are allocated, giving the DL full use of all available resource blocks. Column 506 illustrates three embodiments, in which the UL uses PUSC and six OFDM symbols have been reserved for the DL. Column 508 illustrates three embodiments in which the 802.16m standard is used with 1 sub-frame or 6 OFDM symbols. Column 510 illustrates three embodiments in which the 802.16m standard is used with 2 sub-frames or 12 OFDM symbols.

In various embodiments, instead of using a one-size-fits-all preconfigured burst length size (e.g. 10 bit as in 802.16e) regardless of the actual number of available resource blocks, the BS 104 and MS 106 may select dynamically or during system configuration a size for the burst length field 404. In various embodiments, this size may be based upon the frequency and number of OFDM symbols or scheduling interval used to communicate between the BS and MS.

In some embodiments, the size of the burst length field 404 may be selected by determining the frequency or bandwidth used for communication with the MS. In one embodiment, the size of the burst length field 404 may be selected by determining the number of OFDM symbols or scheduling interval used to communicate with the MS. In such an embodiment, a look-up table, based on the frequency and number of OFDM symbols (e.g. table 500), may be used to select the size of the burst length field 404.

For example, in one embodiment, a BS 104 may be configured to use a bandwidth of 20 MHz and the 802.16m standard of 2 sub-frames (12 OFDM symbols). In such an embodiment, these bandwidth and symbol values may be determined during the configuration of the BS 104. The BS 104 may then use table 500, or a similar look-up table to determine that a minimum of 8 bits is needed to represent all possible available 192 resource blocks (a savings of 2 bits compared to the 802.16e 10 bit reference). In some embodiments, the BS 104 may calculate the number of available resource blocks and then compute the minimum number of bits needed to represent that value. The above have assumed embodiments in which the burst length value is stored as an un-encoded binary number; however, other encoding schemes are possible and within the scope of the disclosed subject matter.

In various embodiments, the BS 104 may transmit a message to the MS 106 indicating the size of the burst length field 404. In another embodiment, the MS 104 may infer or independently derive the size of the burst length field 404 based upon available data. For example, in one embodiment, the BS 104 may periodically broadcast a message, which may be received by an MS, that indicates a bandwidth value and a sub-frame concatenation value or scheduling interval or the number of OFDM symbols. In a specific embodiment, in the 802.16e standard such a message is referred to as a Channel Descriptor message (e.g. a DL channel descriptor (DCD) or UL channel descriptor (UCD)). In another specific embodiment, in the 802.16m standard such a message may be referred to as a Broadcast Channel message. Although, it is understood that the above are merely a few illustrative examples to which the disclosed subject matter is not limited. In such an embodiment, the BS 104 may simply assume that the MS 106 will determine the size of the burst length field 404 using the bandwidth value and scheduling interval value.

In such an embodiment as discussed above in reference to Table 500, the size of the burst length value 404 may vary from BS to BS, as each BS may use a different bandwidth and number of OFDM symbols or scheduling interval per sub-frame. As such, the MS 104 may resize its expected size for the burst length field 404 as it moves from BS to BS.

FIG. 6 is a table 600 of an example embodiment of a system in accordance with the disclosed subject matter. In various embodiments, the burst length field 404 may include a fixed sized portion 410 and a variable sized portion 412, as described above. In various embodiments, the size of the variable sized portion 412 may be based upon or merely related to the value of the fixed sized portion 410. In such an embodiment, the value of the burst length field 404 may be based upon three values, the value of the fixed sized portion 410 (F), the value of the variable sized portion 412 (V), and an Exponential Offset Value 210 (E).

In one embodiment, the table 600 may include the following: a fixed sized value column 602 that represents the possible values of the fixed sized portion 410; a variable sized number of bits column 604 that represents the possible sizes of the variable sized portion 412; a total burst length number of bits column 606 that represents the size of the total burst length field 404, and a possible allocation blocks column 608 that represents the possible number of resource blocks that may be allocated or the values of the burst length field 404 given the size of the burst length field 404.

In one embodiment, the value (B) of the burst length field 404 may be computed, for non-zero values of the fixed sized portion 410, as one plus the value of the variable sized portion 412 (V) plus, two to the power of the value of the fixed sized portion 410 (F) added to the Exponential Offset Value 210 (E) (i.e., B=(1+V)+$2^{(F+E)}$). Whereas, in one embodiment, for cases in which the value of the fixed sized portion 410 is zero, the value of the burst length field 404 may equal one plus the value of the variable sized portion 412 (i.e., B=1+V). Stated in a more pseudo-code fashion, the value of the burst length field 404, in one embodiment, may be computed as:

$$\begin{aligned}&\text{If } (F == 0)\\&\quad\quad \{ B = 1 + V \}\\&\text{else}\\&\quad\quad \{ B = (1+V) + 2^{(F+E)} \}\end{aligned}$$

Table 600 illustrates an embodiment in which the size of the fixed sized portion 410 is set to 3-bits and may represent values of 0-7. In this embodiment, the exponential offset value 210 may be set to one. In various embodiments, the exponential offset value 210 may be set during system or device configuration or, in other embodiments, may be derived from the bandwidth and scheduling interval or OFDM symbol settings or indicated in system broadcast message.

In one illustrative example embodiment, a system similar to system 100 of FIG. 1 may include five (versus three) MSs. In such an embodiment, the BS 104 may allocate 3, 11, 45, 13, and 7 resource blocks to each MS, respectively. If, in one embodiment, the system uses a scheme represented in table 600 to encode the burst length field 404, the number of bits used for each MS would equal 5, 6, 8, 6, and 5, respectively. This would bring the total size of the five burst length fields 404 to 30 bits (5+6+8+6+5=30). Compared to the 802.16e standard of 10 bits per burst length field (totaling 50 bits), this scheme would be a savings of 20 bits or 40%. Although, it is understood that the above is merely one illustrative example to which the disclosed subject matter is not limited.

In various embodiments, the value of the fixed sized portion 410 (F) may be computed by calculating the integer portion of a binary logarithm of the number of allocated resource blocks (R) minus one and subtracting the exponential offset value 210 (E) (i.e., $F=int(log_2(R-1))-E$). In some embodiments, the lowest possible value of the fixed sized portion 410 may be zero. So, for example if the computation produced a negative value (e.g. if R=2 and E=2, then F would compute to −1), the value of the fixed sized portion 410 may be set to zero. However, in another embodiment, a negative value may be acceptable.

In various embodiments, the size of the fixed sized portion 410 (Fs) and the exponential offset value 210 (E) may be predetermined. In one embodiment, the size of the fixed sized portion 410 and the exponential offset value 210 may be selected such that two to the power of the highest possible value of fixed sized portion 410 (F) (e.g. 7 if the fixed sized portion 410 includes 3 bits) plus the exponential offset value 210 is equal to one-half of the total number of available resource blocks (R) (i.e., $2^{(max(F)+E)}=max(R)/2$). In various embodiments, a size of the fixed sized portion 410 may be selected to minimize the total number of bits used for the burst length field 404.

In various embodiments, the size of the variable sized portion 412 (Vs) may be computed by calculating the integer portion of the binary logarithm of the number of allocated resource blocks (R) minus one (i.e., $Vs=int(log_2(R-1))$). For example, if 234 resource blocks have been allocated in the system based upon table 600 (Fs=3 and E=1) the size of the variable sized portion 412 may equal 7 bits. In some embodiments, the lowest possible size of the variable sized portion 412 may be one plus the exponential offset value 210 (E) (i.e., min(Vs)=1+E). So, for example if the computation produced a below minimum value or undefined value (e.g. if R=2, then Vs would compute to 1), the size of the variable sized portion 412 would be set to the minimum (e.g. min(Vs)=2 if E=1). However, in another embodiment, other computations and minimums may be used and the disclosed subject matter is not limited to the illustrative embodiment above.

In various embodiments, the value of the variable sized portion 412 (V) may be computed by determining if the value of the fixed value portion 410 (F) is zero. If it is zero, the value of the variable sized portion 412 (V) may be computed as or set to the number of allocated resource blocks (R) minus one (i.e., if (F==0) then V=R−1). In some embodiments, if the value of the fixed value portion 410 (F) is positive, the value of the variable sized portion 412 (V) may be computed as or set to the number of allocated resource blocks (R) minus one, minus two to the power of the binary logarithm of the number of allocated resource blocks (i.e., if (F>=0) then $V=R-1-2^k$ where k=floor($log_2$ R)). However, in another embodiment, other computations and minimums may be used and the disclosed subject matter is not limited to the illustrative embodiment above.

Returning to the previous illustrative embodiment in which one BS communicated with five MSs. As described above, the MSs may be allocated 3, 11, 45, 13, and 7 resource blocks, respectively. In an embodiment illustrated by Table 600, the first MS's fixed sized portion 410 may have a value of 0 and the variable sized portion 412 may have a value of 3 or "10", in binary. The second MS's fixed sized portion 410 may have a value of 2 and the variable sized portion 412 may have a value of 2 or "010". The third MS's fixed sized portion 410 may have a value of 4 and the variable sized portion 412 may have a value of 12 or "101100". The fourth MS's fixed sized portion 410 may have a value of 2 and the variable sized portion 412 may have a value of 4 or "100". The fifth and last MS's fixed sized portion 410 may have a value of 1 and the variable sized portion 412 may have a value of 2 or "10". The reader is reminded that generally, in this embodiment, as the value of the fixed sized portion 410 increases the size of the variable sized portion 412 increases. So, the third MS uses 5 bits to represent the variable sized portion 412 despite the most significant binary bit (MSB) equaling zero. Although, it is understood that the above are merely a few illustrative examples to which the disclosed subject matter is not limited.

FIG. 7 is a table 700 of an example embodiment of a system in accordance with the disclosed subject matter. In one embodiment, the table 700 may include the following: a fixed sized value column 702 that represents the possible values of the fixed sized portion 410; a variable sized number of bits column 704 that represents the possible sizes of the variable sized portion 412; a total burst length number of bits column &06 that represents the size of the total burst length field 404, and a possible allocation blocks column 708 that represents the possible number of resource blocks that may be allocated or the values of the burst length field 404 given the size of the burst length field 404.

In such an embodiment, the system using table 700 may be able to allocate 1024 resource blocks. For example, a greater bandwidth may be used etc. in this system than the system using table 600 that may allocate up to 512 resource blocks. In one embodiment, the ability to allocate 1024 resource blocks may occur by increasing the exponential offset value 210 from 1 to 2, as shown in table 700. However, it is understood that other techniques may be used, such as, increasing the number bits or size of the fixed sized portion 410.

In various embodiments, shown for examples in table 600 and table 700, there may be instances or resource block allocations in which the total number of bits used to represent the fixed sized portion 410 and the variable sized portion 412 may be equal to or greater than the bits needed to represent the allocation using a simple un-encoded binary number. For example, in one embodiment, a 1024 resource block allocation would use 12 bits in the scheme illustrated by Table 700, but only 10 bits in the 802.16e standard; although, it is understood that the above is merely one illustrative example to which the disclosed subject matter is not limited.

In such an embodiment, if the number of allocated resource blocks is less than or equal to one-fourth a maximum number of possible resource blocks, the size of the burst length field may be equal to or less than the binary logarithm of the maximum number of possible resource blocks. In one embodiment, if the number of allocated resource blocks is greater than one-fourth a maximum number of possible resource blocks, the size of the burst length field may be is greater than the binary logarithm of the maximum number of possible resource blocks. In various embodiments, the technique similar to those illustrated by tables 600 and 700 may be used in environments in which relatively small resource block allocations are expected to be made.

In various embodiments, the BS may broadcast a message (e.g., a DCD, UCD, etc.) that includes an indication of the encoding scheme used to encode the burst length field. In one such embodiment, the message may include the size of the fixed sized portion 410 and the exponential offset value 210. In various embodiments, the MS may decode a burst length field 404 given these two values. In another embodiment, the values may be standardized in general or based upon a bandwidth and sub-frame concatenation value, scheduling interval, as described above. In another embodiment, the encoding scheme change message may select an encoding scheme from a predefined list of schemes. For example, in one embodiment, the schemes may include those of FIGS. 5, 6, 7, and a generic scheme such as the 802.16e 10 bit scheme; although, it is understood that the above are merely a few illustrative examples to which the disclosed subject matter is not limited.

In various embodiments, the BS 104 may be capable of dynamically changing the encoding scheme, for example if the previous scheme becomes inefficient. In one such embodiment, prior to changing schemes the BS 104 may broadcast an encoding scheme change message, as described above. For example, in various embodiments, the number of available resource blocks may be split between DL and UL phases. In some embodiments, the portioning of the DL and ULs may dynamically change. In one specific illustrative embodiment, 1024 resource blocks may be available between the DL and UL. Originally these blocks may be apportioned as 512 to the DL and 512 to the UL. In such an embodiment, the scheme illustrated by Table 600 may be used. However, if the portioning was dynamically altered to 768 DL and 256 UL, the encoding scheme may change to the one illustrated by Table 700 for the DL and another scheme not explicitly shown (e.g. one with a exponential offset value 210 of zero, or a 2 bit fixed sized portion 410, etc.) for the UL. Although, it is understood that the above are merely a few illustrative examples to which the disclosed subject matter is not limited.

In various embodiments, an index value, not just the burst length field 404, may be encoded using the encoding scheme discussed above in reference to FIGS. 6 & 7. In various embodiments, the indexes may include an Automatic Repeat-reQuest (ARQ) offset or sequence number, connection identifiers; although, it is understood that the above are merely a few illustrative examples to which the disclosed subject matter is not limited. These selected fields may be encoded using a fixed sized portion and a variable sized portion. In various embodiments, a transmitted field that is allocated more bits than is usually needed may be made more efficient by converting to the above technique. In some embodiments, one or more transmitted fields may include the fixed sized portion and variable sized portion, as described above.

FIG. 8 is a flowchart of an example embodiment of a technique 800 in accordance with the disclosed subject matter. In various embodiments, parts or all of the technique 800 may be the results of the operations of the system 100 of FIG. 1 or devices 201 and 203 of FIG. 2. Although, it is understood that other systems and timing diagrams may produce technique 800. Furthermore, it is understood that FIGS. 8a, 8b, and 8c represent a single flowchart illustrated on multiple pages and connected via the connectors of Blocks 801 and 803, here-before and here after the multiple pages will simply be referred to as FIG. 8.

Further, in various embodiments, some of the sub-portions or sub-actions of the actions illustrated by FIG. 8 as occurring within technique 800 may be mutually exclusive. In the illustrated embodiment, some of these sub-actions have been grouped via dotted boxes such that independent groups of sub-actions may be more clearly defined. Also, it is understood that one or more actions may be represented multiple times within FIGS. 8a, 8b, and 8c as space may limit the ability to illustrate the desired variations (again, possibly mutually exclusive variations) that may be included in various embodiments of the action. In addition, it is understood that not all embodiments may include every action or sub-action or may not occur in the illustrated order. It is understood that the herein are merely a few illustrative examples to which the disclosed subject matter is not limited.

Block 802 illustrates that, in one embodiment, a connection with at least one mobile station (MS) may be established, as described above. In various embodiments, the base station 104 of FIG. 1 or the transceiver 202 of FIG. 2 may perform this action, as described above.

Block 804 illustrates that, in one embodiment, communication resources, measured in resource blocks, may be allocated to the MS, as described above. In various embodiments, the base station 104 of FIG. 1 or the controller 204 of FIG. 2 may perform this action, as described above.

Block 806 illustrates that, in one embodiment, a message may be broadcast to the MS that indicates a bandwidth value and a scheduling interval value, as described above. In some embodiments, the scheduling interval value may include a sub-frame concatenation, as described above. In various embodiments, the base station 104 of FIG. 1 or the transceiver 202 of FIG. 2 may perform this action, as described above. Block 808 illustrates that, in one embodiment, the BS may assume that the MS will determine the size of the burst length field using the bandwidth value and scheduling interval value, as described above. In various embodiments, the base station 104 of FIG. 1 or the controller 204 of FIG. 2 may perform this action, as described above.

Block 810 illustrates that, in one embodiment, a size of a burst length field may be selected, as described above. In some embodiments, the size may be based in part upon a bandwidth and a number of orthogonal frequency-division multiplexing (OFDM) symbols or scheduling interval used to communicate with the MS, as described above. In various embodiments, the base station 104 of FIG. 1 or the controller 204 of FIG. 2 may perform this action, as described above.

Block 812 illustrates that, in one embodiment, selecting may include determining the bandwidth used for communication with the MS, as described above. Block 814 illustrates that, in one embodiment, selecting may include determining a value corresponding to the scheduling interval (e.g. the number of OFDM symbols) used to communicate with the MS, as described above. Block 816 illustrates that, in one embodiment, selecting may include using a look-up table based upon the bandwidth and a value corresponding to the scheduling interval to select the size of the burst length field, as described above. In various embodiments, the base station 104 of FIG. 1 or the controller 204 of FIG. 2 may perform these actions, as described above.

In one embodiment, selecting may include determining a number of resource blocks assigned to the MS, as described above. In various embodiments, determining may include simply retrieving the allocation value from Block 804, as described above. In various embodiments, the base station 104 of FIG. 1 or the controller 204 of FIG. 2 may perform this action, as described above.

Block 830 illustrates that, in one embodiment, selecting may include computing the value of the fixed sized portion by the following steps. Blocks 832 and 834 illustrate that, in one embodiment, computing may include calculating an integer portion of a binary logarithm of the number of allocated resource blocks minus one and from that subtracting a predetermined exponential offset value from the integer portion of the binary logarithm, as described above. Block 836 illustrates that, in one embodiment, the lowest value of the fixed sized portion may be zero, as described above. Block 837 illustrates that, in one embodiment, the computed value into a binary representation using a number of bits equal to the number of bits of the fixed sized portion, as described above. In various embodiments, the base station 104 of FIG. 1 or the controller 204 of FIG. 2 may perform these actions, as described above.

Block 840 illustrates that, in one embodiment, selecting may include computing the value of the variable sized portion as described by the following steps. Block 842 illustrates that, in one embodiment, if the value of the fixed sized portion is zero, setting the value of the variable sized portion equal to the number of allocated resource blocks minus one, as described above. Block 844 illustrates that, in one embodiment, if the value of the fixed sized portion is greater than zero, setting the value of the variable sized portion equal to the number of allocated resource blocks minus one minus two to the power of the integer portion of the binary logarithm of the number of allocated resource blocks, as described above. In various embodiments, the base station 104 of FIG. 1 or the controller 204 of FIG. 2 may perform these actions, as described above.

Block 850 illustrates that, in one embodiment, selecting may include computing the size of the variable sized portion by the following steps. Block 852 illustrates that, in one embodiment, computing may include calculating the integer portion of the binary logarithm of one less than the number of allocated resource blocks, as described above. Block 854 illustrates that, in one embodiment, the smallest size of the variable sized portion equals one plus a predetermined exponential offset value, as described above. In various embodiments, the base station 104 of FIG. 1 or the controller 204 of FIG. 2 may perform these actions, as described above.

Block 860 illustrates that, in one embodiment, selecting may include determining a maximum number of possible resource blocks based upon the bandwidth and number of OFDM symbols, as described above. Block 862 illustrates that, in one embodiment, selecting may include computing a maximum size of the variable sized portion by calculating the binary logarithm of the number of resource blocks minus one (i.e., $V_s = \text{int}(\log_2(R-1))$), as described above. Block 864 illustrates that, in one embodiment, selecting may include computing a fixed sized portion by, for a given exponential offset value, calculating the integer portion of the binary logarithm of the number of resource blocks minus one, and subtracting the exponential offset value, wherein the fixed sized portion has a minimum value of zero, as described above. In another embodiment, the size of the fixed sized portion may be computed as follows: the number of bits for the fixed portion ($F_s$) may be equal to, subject to a ceiling or maximum value, the binary logarithm of a binary logarithm, subject to a floor or minimum value, of the maximum number of possible allocated resource blocks minus one, one minus the exponential offset value (i.e., $F_s = \text{ceiling}(\log_2(\text{floor}(\log_2(R_{max}-1))+1-E))$, as described above. In various embodiments, the base station 104 of FIG. 1 or the controller 204 of FIG. 2 may perform these actions, as described above.

Block 866 illustrates that, in one embodiment, selecting may include if the number of allocated resource blocks is less than or equal to one-fourth a maximum number of possible resource blocks, selecting a size of the burst length field that is equal to or less than the binary logarithm of the maximum number of possible resource blocks, as described above. Block 868 illustrates that, in one embodiment, selecting may include if the number of allocated resource blocks is greater than one-fourth a maximum number of possible resource blocks, selecting a size of the burst length field that is greater than the binary logarithm of the maximum number of possible resource blocks, as described above. In various embodiments, the base station 104 of FIG. 1 or the controller 204 of FIG. 2 may perform these actions, as described above.

Block 870 illustrates that, in one embodiment, a message may be transmitted that indicates an encoding scheme used to encode the burst length field, as described above. Block 872 illustrates that, in one embodiment, a message may be transmitted, to the MS, that includes the burst length field, as described above. In various embodiments, the base station 104 of FIG. 1 or the controller 204 of FIG. 2 may perform these actions, as described above.

FIG. 9 is a flowchart of an example embodiment of a technique 900 in accordance with the disclosed subject matter. In various embodiments, the technique 900 may be included as part of technique 800.

Block 902 illustrates that, in one embodiment, an index field or numerical field may be encoded for transmission, as described above. Block 904 illustrates that, in one embodiment, the encoded index field may include a fixed sized portion, and a variable sized portion, as described above. In various embodiments, the size of the variable sized portion is related to the value of the fixed size portion, as described above. In various embodiments, the base station 104 of FIG. 1 or the controller 204 of FIG. 2 may perform these actions, as described above.

Block 906 illustrates that, in one embodiment, the value of the index field is calculated using the following steps. Block 908 illustrates that, in one embodiment, if the value of the fixed sized portion is non-positive, the value of the index field may be equal to one plus the value of the variable sized portion, as described above. Block 910 illustrates that, in one embodiment, if the value of the fixed sized portion is positive, the value of the index field may be equal to one plus the value of the variable sized portion plus two to the power of the sum of the value of the fixed sized portion and an predetermined exponential offset value, as described above. In various embodiments, the base station 104 of FIG. 1 or the controller 204 of FIG. 2 may perform these actions, as described above.

Block 912 illustrates that, in one embodiment, the index field may be transmitted, as described above. In various embodiments, the base station 104 of FIG. 1 or the transmitter 202 of FIG. 2 may perform these actions, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g. in a machine-readable storage device or in a propagated signal, for execution by, or to control the operation of, data processing apparatus, e.g. a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g. an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g. internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g. as a data server, or that includes a middleware component, e.g. an application server, or that includes a front-end component, e.g. a client computer having a graphical user interface or a Web browser through which a user can interact with an implementation, or any combination of such back-end, middleware, or front-end components. Components may be interconnected by any form or medium of digital data communication, e.g. a communication network. Examples of communication networks include a local area network (LAN) and a wide area network (WAN), e.g. the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    establishing a connection with at least one mobile station (MS);
    allocating communication resources, in resource blocks, to the MS;
    selecting a size of a burst length field based in part upon a bandwidth and a scheduling interval used to communicate with the MS;
    transmitting, to the MS, a message that includes the burst length field; and
    wherein the value of the burst length field indicates to the MS the number of resource blocks allocated to the MS for purposes of communication
    wherein the burst length field includes a fixed sized portion, and a variable sized portion, wherein the size of the variable sized portion is related to the value of the fixed size portion; and
    wherein selecting includes:
    determining a maximum number of possible resource blocks based upon the bandwidth and scheduling interval;
    computing a maximum size of the variable sized portion by calculating the integer portion of the binary logarithm of the number of resource blocks minus one; and
    computing a fixed sized portion by, for an exponential offset value, calculating the integer portion of the binary logarithm of the number of resource blocks minus one, and subtracting the exponential offset value, wherein the fixed sized portion has a minimum value of zero.

2. A method comprising:
    establishing a connection with at least one mobile station (MS);
    allocating communication resources, in resource blocks, to the MS;
    selecting a size of a burst length field based in part upon a bandwidth and a scheduling interval used to communicate with the MS;
    transmitting, to the MS, a message that includes the burst length field; and
    wherein the value of the burst length field indicates to the MS the number of resource blocks allocated to the MS for purposes of communication
    wherein the burst length field includes a fixed sized portion, and a variable sized portion, wherein the size of the variable sized portion is related to the value of the fixed size portion; and
    wherein selecting includes, for each of the at least one MS:
    computing the value of the fixed sized portion by:
    calculating an integer portion of a binary logarithm of the number of allocated resource blocks minus one, subtracting a predetermined exponential offset value from the integer portion of the binary logarithm, and setting the result to zero if the value is negative, and converting the final value in the binary format with the fixed number of bits.

3. A method comprising:
    establishing a connection with at least one mobile station (MS);
    allocating communication resources, in resource blocks, to the MS;
    selecting a size of a burst length field based in part upon a bandwidth and a scheduling interval used to communicate with the MS;
    transmitting, to the MS, a message that includes the burst length field; and
    wherein the value of the burst length field indicates to the MS the number of resource blocks allocated to the MS for purposes of communication
    wherein the burst length field includes a fixed sized portion, and a variable sized portion, wherein the size of the variable sized portion is related to the value of the fixed size portion; and
    wherein selecting includes, for each of the at least one MS:
    computing the value of the variable sized portion as:
    if the value of the fixed sized portion is zero,
        setting the value of the variable sized portion equal to the number of allocated resource blocks minus one, and
    if the value of the fixed sized portion is greater than zero,
        setting the value of the variable sized portion equal to:

the number of allocated resource blocks minus one, minus two to the power of the integer portion of the binary logarithm of the number of allocated resource blocks, and converting the final value in the binary format with the size given by the variable sized portion.

4. A method comprising:

establishing a connection with at least one mobile station (MS);

allocating communication resources, in resource blocks, to the MS;

selecting a size of a burst length field based in part upon a bandwidth and a scheduling interval used to communicate with the MS;

transmitting, to the MS, a message that includes the burst length field; and wherein the value of the burst length field indicates to the MS the number of resource blocks allocated to the MS for purposes of communication; and the method further including:

encoding an index field for transmission;

transmitting the index field;

wherein the encoded index field includes:

a fixed sized portion, and a variable sized portion, wherein the size of the variable sized portion is related to the value of the fixed size portion; and wherein the value of the index field is calculated as:

if the value of the fixed sized portion is non-positive, one plus the value of the variable sized portion, and if the value of the fixed sized portion is positive, one plus the value of the variable sized portion plus two to the power of the sum of the value of the fixed sized portion and an predetermined exponential offset value.

5. An apparatus comprising:

a wireless transceiver configured to:

establish a connection with at least one mobile station (MS);

transmit, to the MS, a message that includes a burst length field;

a controller configured to:

allocate communication resources, in resource blocks, to the MS;

select a size of a burst length field based in part upon a bandwidth and a scheduling interval used to communicate with the MS;

a memory configured to store the burst length field; and wherein the value of the burst length field indicates to the MS the number of resource blocks allocated to the MS for purposes of communication;

wherein the burst length field includes a fixed sized portion, and a variable sized portion, wherein the size of the variable sized portion is related to the value of the fixed size portion; and wherein the controller is configured to:

determine a maximum number of possible resource blocks based upon the bandwidth and scheduling interval;

computing a maximum size of the variable sized portion by calculating the integer portion of the binary logarithm of the number of resource blocks minus one; and computing a fixed sized portion by, for a size of the fixed portion by calculating, subject to a maximum value, the binary logarithm of a binary logarithm, subject to a minimum value, of the maximum number of possible allocated resource blocks minus one, one minus the exponential offset value.

6. An apparatus comprising:

a wireless transceiver configured to:

establish a connection with at least one mobile station (MS);

transmit, to the MS, a message that includes a burst length field;

a controller configured to:

allocate communication resources, in resource blocks, to the MS;

select a size of a burst length field based in part upon a bandwidth and a scheduling interval used to communicate with the MS;

a memory configured to store the burst length field; and wherein the value of the burst length field indicates to the MS the number of resource blocks allocated to the MS for purposes of communication;

wherein the burst length field includes a fixed sized portion, and a variable sized portion, wherein the size of the variable sized portion is related to the value of the fixed size portion; and wherein the controller is configured to:

determine a number of resource blocks assigned to the MS; and compute the value of the fixed sized portion by:

calculating an integer portion of a binary logarithm of the number of allocated resource blocks minus one, subtracting a predetermined exponential offset value from the integer portion of the binary logarithm, and setting the result to zero if the value is negative, and converting the final value in the binary format with the fixed number of bits.

7. An apparatus comprising:

a wireless transceiver configured to:

establish a connection with at least one mobile station (MS);

transmit, to the MS, a message that includes a burst length field;

a controller configured to:

allocate communication resources, in resource blocks, to the MS;

select a size of a burst length field based in part upon a bandwidth and a scheduling interval used to communicate with the MS;

a memory configured to store the burst length field; and wherein the value of the burst length field indicates to the MS the number of resource blocks allocated to the MS for purposes of communication;

wherein the burst length field includes a fixed sized portion, and a variable sized portion, wherein the size of the variable sized portion is related to the value of the fixed size portion; and wherein the controller is configured to:

compute the value of the variable sized portion as:

if the value of the fixed sized portion is zero, the value of the variable sized portion equal to the number of allocated resource blocks minus one, and if the value of the fixed sized portion is greater than zero, the value of the variable sized portion equal to:

the number of allocated resource blocks minus one, minus two to the power of the integer portion of the binary logarithm of the number of allocated resource blocks, and converting the final value in the binary format with the size given by the variable sized portion.

8. An apparatus comprising:
a wireless transceiver configured to:
- establish a connection with at least one mobile station (MS);
- transmit, to the MS, a message that includes a burst length field;

a controller configured to:
- allocate communication resources, in resource blocks, to the MS;
- select a size of a burst length field based in part upon a bandwidth and a scheduling interval used to communicate with the MS;

a memory configured to store the burst length field; and
wherein the value of the burst length field indicates to the MS the number of resource blocks allocated to the MS for purposes of communication; and
wherein the controller is configured to:
- encode an index field for transmission;

wherein the wireless transceiver is configured to transmit the index field;
wherein the encoded index field includes: a fixed sized portion, and a variable sized portion, wherein the size of the variable sized portion is related to the value of the fixed size portion; and
wherein the value of the index field is calculated as:
- if the value of the fixed sized portion is non-positive, one plus the value of the variable sized portion, and
- if the value of the fixed sized portion is positive,
  - one plus the value of the variable sized portion plus two to the power of the sum of the value of the fixed sized portion and an predetermined exponential offset value.

\* \* \* \* \*